July 7, 1959
E. A. DE PEU
2,893,131
PIPE CUTTING INDICATOR
Filed May 13, 1955
2 Sheets-Sheet 1
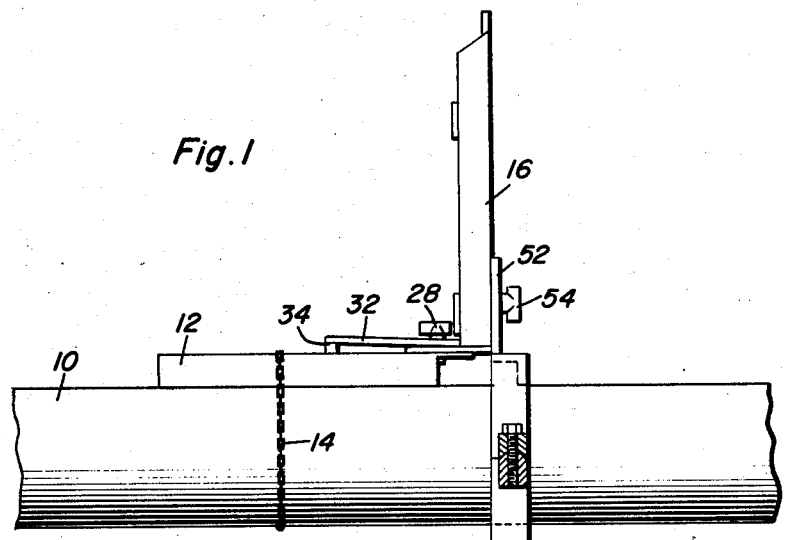
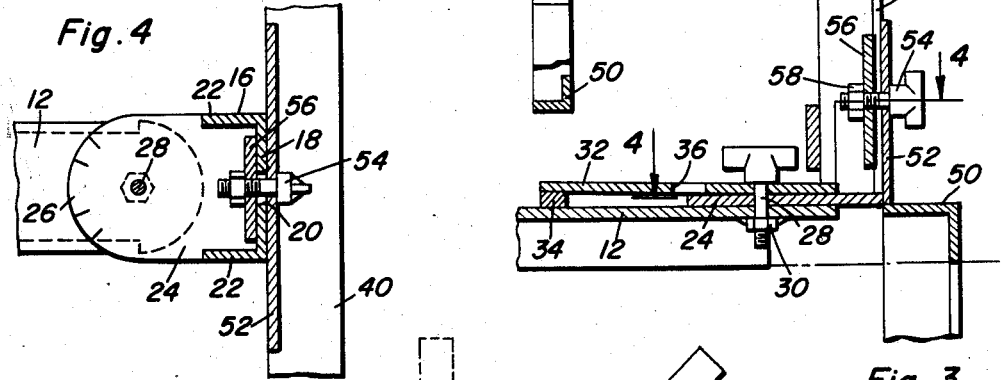
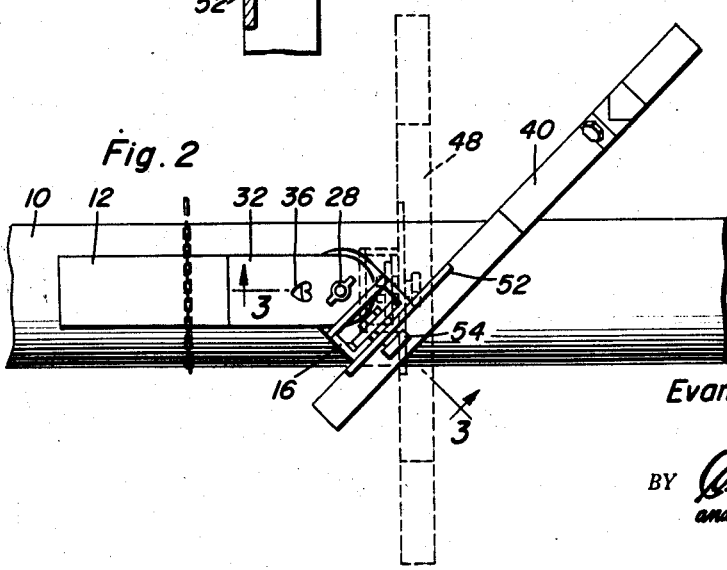
Evans A. De Peu
INVENTOR.
BY
*Attorneys*

July 7, 1959 — E. A. DE PEU — 2,893,131
PIPE CUTTING INDICATOR
Filed May 13, 1955 — 2 Sheets-Sheet 2

Evans A. De Peu
INVENTOR.

BY *Clarence A. O'Brien*
*and Harvey B. Jacobson*
Attorneys

United States Patent Office 2,893,131
Patented July 7, 1959

2,893,131

PIPE CUTTING INDICATOR

Evans A. De Peu, San Francisco, Calif.

Application May 13, 1955, Serial No. 508,009

6 Claims. (Cl. 33—174)

This invention comprises novel and useful improvements in a pipe cutting indicator and more specifically relates to a gauge for the angular scribing and cutting of pipes.

The primary object of this invention is to provide a gauging device which may be readily applied to pipes of different sizes to facilitate the scribing or cutting of such pipes upon various predetermined planes which are angularly inclined with respect to the longitudinal axis of the pipe.

A further object of the invention is to provide a gauge in conformity with the foregoing object which can be readily applied to pipes of different sizes and which shall be effective for the inscribing or cutting of such pipes upon various predetermined angles.

A further object of the invention is to provide a pipe cutting indicator in conformity with the preceding objects wherein a protractor to enable the setting of the device at predetermined angles shall cooperate with the base portion and the gauging portion of the device in an improved manner.

A still further object of the invention is to provide a gauging device as set forth in the foregoing objects in which a straight edge shall be adjustably carried by the angle adjusting portion of the device in an improved and advantageous manner.

A still further object of the invention is to provide a device in accordance with the foregoing objects wherein there shall be provided a straight edge which shall be readily adjustable for positioning the same in planes at various predetermined angular relations with respect to the longitudinal axis of the pipe; and whereby various portions of the internal periphery of the straight edge may be placed upon circumferentially extending portions of the pipe for scribing or cutting the same upon a plane at the said predetermined angle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing a portion of a pipe to which an embodiment in accordance with the principles of this invention is applied, a portion of the straight edge frame being broken away and shown in section;

Figure 2 is a top plan view of the arrangement of Figure 1, an alternative position of the straight edge frame being shown in dotted lines therein;

Figure 8:
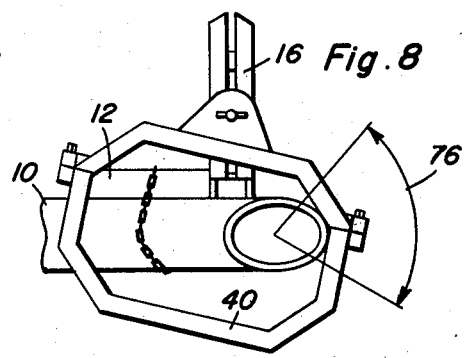
Figure 9:
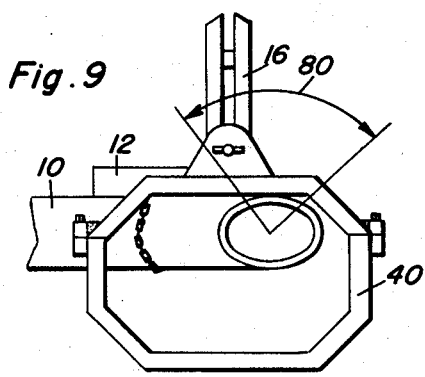
Figure 10:
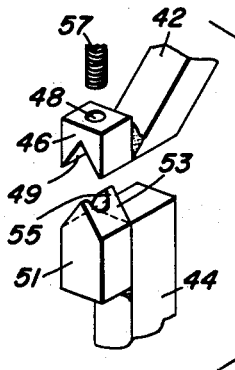

Figure 3 is a detail view in vertical section taken upon an enlarged scale substantially upon the plane indicated by the broken section line 3—3 of Figure 2 and showing certain details of the adjusting mechanism for positioning the gauge in a plane at predetermined angles with respect to the longitudinal axis of the pipe and for adjusting the gauge in various angular positions in said predetermined plane;

Figure 4 is a detail view in horizontal section taken substantially upon the plane indicated by the broken section line 4—4 of Figure 3 and showing further details of the manner in which the straight edge frame is adjustably secured upon a standard carried by the angle adjusting portion of the device;

Figures 5–9 are sequential views showing the vertical and pivotal adjustments of the straight edge frame upon its supporting standard in order to position portions of the straight edge frame upon successive circumferential portions of the pipe during the scribing or cutting of the same; and Figure 10 is a group perspective fragmentary detail view showing the detachable connection of components of the frame of the device.

Referring first to Figures 1 and 2, it will be observed that the numeral 10 designates a portion of a pipe which it is desired to cut upon a plane disposed at a predetermined angle with respect to the longiutdinal axis of the pipe. The gauge or indicator forming the subject of this invention consists of a base 12 which may conveniently include a flat top surface from which depend longitudinally extending ribs or the like whereby the base may be supported upon and rest upon a pipe in longitudinal alignment therewith. A chain or the like 14 is provided whereby the base may be rigidly clamped to the pipe at a predetermined portion thereof, the actual construction of the clamp and fastening means being immaterial for the purposes of this invention.

Movably mounted upon the base 12 is a standard 16. The latter may conveniently comprise a channel member having a vertically disposed flat plate 18 which is perpendicular to the longitudinal axis of the pipe upon which the base is secured, this plate having at its central portion a vertically extending longitudinal slot 20. Wherever desired, vertical parallel rearwardly extending flanges 22 may be provided upon the standard to impart rigidity thereto.

At its lower end, the standard has rigidly secured thereto a horizontal, rearwardly extending plate 24, which, as best shown in Figure 3 rests upon the top surface of the base 12 adjacent one end thereof.

Adjacent its rearward end, as shown in Figure 4, the plate 24 is rounded and provided with suitable indicia to provide a protractor 26. Disposed centrally of the protractor, there is provided a pivot whereby the standard and the plate carrying the protractor are secured to the base 12 for rotation about a vertical axis which is perpendicular to the base and is preferably upon a radius of the pipe 10. This pivotal means consists of a bolt 28 which extends through aligned apertures in the protractor plate 24 and in the base 12, being provided with a nut 30 welded or otherwise secured to the underside of the base.

Cooperating with the protractor plate 24, there is provided a stationary or fixed plate 32 which is carried by a lug 34 welded or otherwise secured to the base and to the plate 32. The latter overlies the protractor plate 24, which is clamped between the overlying plate and the base by the above mentioned bolt 28 comprising the pivot means for the standard.

At a convenient portion of the overlying plate 32, there is provided an aperture 36 which is so positioned as to permit visual inspection of the indicia upon the protractor 26 and constitute a reference point, as shown in Figure 2, thus enabling the protractor to be used to set the standard in various planes which are perpendicular to the longitudinal axis and disposed at predetermined angles relative thereto. The effects of this arrangement may be seen by a comparison of the full and dotted lines of Figure 2, from which it will be apparent that the standard may be moved through various inclined planes relative to the longitudinal axis of the pipe.

Movably carried by the standard 16 is a frame 40 comprising a straight edge. This frame, as indicated in Figure 1 and Figure 3, preferably is L-shaped in cross-section, as shown at 50, and is provided with a mounting flange 52 which projects outwardly from one side of the frame and is apertured to receive a bolt 54. The latter extends through the previously mentioned slot 20 of the standard 16, and extends through a slide in the form of a plate-like body 56 which slides upon the opposite face of the element 18 of the standard, as will be apparent from Figure 4, a locking nut 58 being provided upon the bolt for clamping the plate 56 and the flange 52 upon opposite sides of the standard. By this means, the straight edge frame may be moved vertically or longitudinally of the standard along the slot 20, and may also be provided at various angular positions with respect thereto, as shown in Figures 5–9.

Referring now particularly to Figures 5–9, it will be seen that the straight edge frame 40 consists of a rim having an inner periphery which is of considerably greater area than the cross-sectional area of the pipe 10. Further, this inner periphery includes a plurality of angularly disposed surfaces 60 for a purpose which will be subsequently set forth.

Because of the relatively large area of the internal periphery of the straight edge frame, it will be seen from a comparison of Figures 5–9 that sufficient clearance exists to permit various portions of the inner periphery of the frame to be brought in contact with different circumferential portions of the exterior surface of the pipe. The frame may be maneuvered by vertical movement in the slot 20 or by pivotal movement about its mounting means comprising the fastening and locking bolt 54 in order to produce contact between selected angularly disposed surfaces of the frame and corresponding circumferential portions of the pipe. Further, this area is of such size as to accommodate readily different sizes of pipes therein and also to allow for the aforesaid adjusting movement of the frame with respect to the pipe when the frame is disposed at various inclinations with respect to the axis of the pipe.

Figure 5:
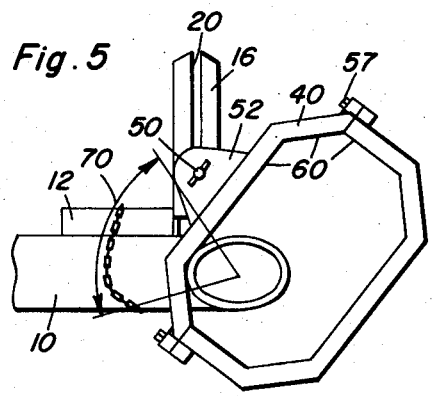
Figure 6:
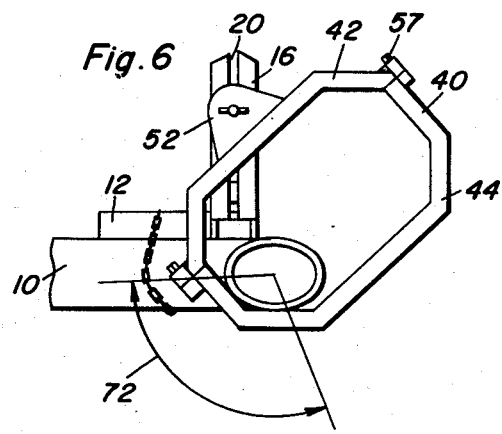
Figure 7:
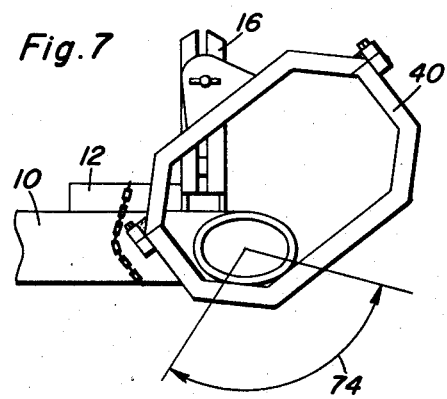

The operation of the device is as follows. With the base clamped securely upon the pipe at a desired position, the standard is rotationally adjusted about its pivoting and locking bolt 28 upon the base, use being made of the protractor 26 to position the standard at the desired angular relation, whereby the forward or outer surface 18 of the standard will be positioned in one of a plurality of planes which are perpendicular with respect to the longitudinal axis of the pipe and are at various angular inclinations with respect thereto. With the standards so positioned, the straight edge frame may be readily moved upwardly or downwardly upon the standard by means of the slot 20, or may be pivoted in the plane of the member 18. By combination of these movements, successive portions of the inner periphery of the straight edge frame may be applied to successive circumferential segments of the exterior surface of the pipe, in a plane determined by the setting of the standard. Thus, as shown in Figure 5, certain of the angularly disposed surfaces of the internal periphery of the frame are engaged upon the pipe throughout a circumferential arcuate section indicated by the angle 70. With the straight edge frame locked in this position, a scribing tool, a cutting tool of any desired type, as for example, a cutting torch, may be held in proper position to mark or cut that circumferential segment of the pipe at the desired predetermined angular plane. After this marking or cutting has been accomplished, the pivotal position of the straight edge frame in the selected plane may be again adjusted, as shown in Figure 6, to permit a succeeding section of the angular surfaces of the internal periphery of the straight edge frame to be placed against the succeeding circumferential section of the pipe, as upon the angle 72. The scribing or cutting operations of Figure 1 may then be continued throughout this succeeding angular portion of the surface of the pipe, but still in the same predetermined plane upon which the inscribing or the cutting is to be accomplished. Thereafter, as shown in Figure 7, the frame may be again adjusted to properly position the same for continuing the operation throughout the angle indicated at 74, and then, as shown in Figure 8, throughout the angle 76, and finally, as shown in Figure 9, throughout the angle 80, thus completing the inscribing or cutting of the entire circumference of the pipe in the predetermined angularly disposed plane.

In some instances, the frame 40 may be of once piece construction. It is deemed preferable, however, in the interest of ease of manufacture, assembly and use to construct it as two separable sections. Thus, as shown in Figures 5–9 and in the detail view of Figure 10, the frame 40 consists of an upper and minor section 42 and a lower and major section 44. The ends of the upper section have connecting blocks 46, which are apertured at 48 and have V-shaped recesses 49. The lower sections carry at their ends connecting blocks 51 having V-shaped projections 53 which are complementary to and are received in the recesses 49.

Screw threaded bores 55 are provided in the projections 53 for the reception of bolts 57 which extend through the bores 48 and secure the two sections of the frame together.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A gauge for the angular scribing and cutting of pipes comprising a base adapted to rest upon the side of a pipe in longitudinal alignment therewith and having a flat, planar top surface, means for clamping said base fixedly upon said pipe, a standard, pivot means mounting said standard upon said base for movement about an axis perpendicular thereto, said standard having a flat plate provided with a protractor and resting upon the flat surface of said base for rotation thereon about said axis whereby to set said standard at predetermined angles relative to the longitudinal axis of said pipe, a rigid frame adapted to loosely encircle said pipe and provide a straight edge for positioning a tool at said predetermined angles relative to the longitudinal axis of said pipe, means mounting said frame for vertical and for pivotal movement upon said standard whereby to successively engage the inner periphery of the frame with the circumference of the pipe.

2. A gauge for the angular scribing and cutting of pipes comprising a base adapted to rest upon the side of a pipe in longitudinal alignment therewith and having a flat, planar top surface, means for clamping said base fixedly upon said pipe, a standard, pivot means mounting said standard upon said base for movement about an axis perpendicular thereto, said standard having a flat plate provided with a protractor and resting upon the flat surface of said base for rotation thereon about said axis whereby to set said standard at predetermined angles relative to the longitudinal axis of said pipe, a rigid frame adapted to loosely encircle said pipe and provide a straight edge for positioning a tool at said predetermined angles relative to the longitudinal axis of said pipe, means mounting said frame for vertical and for pivotal movement upon said standard whereby to successively engage the inner periphery of the frame with the circumference of the pipe, said base having a plate secured thereto and overlying said plate on said standard, said plate on said base having an opening for viewing the protractor on the plate of said standard, said pivoting means extending through both of said plates and said base and constituting a locking means for clamping said standard in rotationally adjusted positions.

3. The combination of claim 1 wherein said standard has a longitudinal slot therein, said frame mounting means being slidably secured in said slot.

4. The combination of claim 2 wherein said standard has a longitudinal slot therein, said frame mounting means being slidably secured in said slot.

5. The combination of claim 1 wherein said frame includes a plurality of angularly disposed surfaces upon its internal periphery whereby vertical and pivotal movement of said frame upon said standard will enable said angularly disposed surfaces to engage different circumferential portions of said pipe.

6. The combination of claim 2 wherein said frame includes a plurality of angularly disposed surfaces upon its internal periphery whereby vertical and pivotal movement of said frame upon said standard will enable said angularly disposed surfaces to engage different circumferential portions of said pipe.

References Cited in the file of this patent

UNITED STATES PATENTS

| | | |
|---|---|---|
| 839,604 | Kralund | Dec. 25, 1906 |
| 1,991,117 | Porteous | Feb. 12, 1935 |
| 2,334,422 | Lehnus | Nov. 16, 1943 |
| 2,437,025 | Hatten | Mar. 2, 1948 |
| 2,453,863 | Salisbury | Nov. 16, 1948 |
| 2,537,704 | Reinhart | Jan. 9, 1951 |
| 2,575,737 | Tyrner | Nov. 20, 1951 |
| 2,607,126 | Sekki | Aug. 19, 1952 |